July 22, 1952  H. G. ROBATEL  2,604,308
APPARATUS FOR AGITATING REFRIGERATED LIQUIDS
Filed Oct. 8, 1949
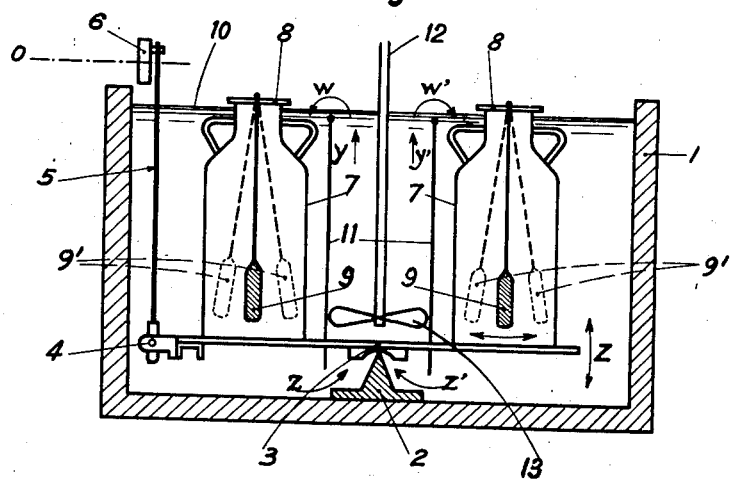
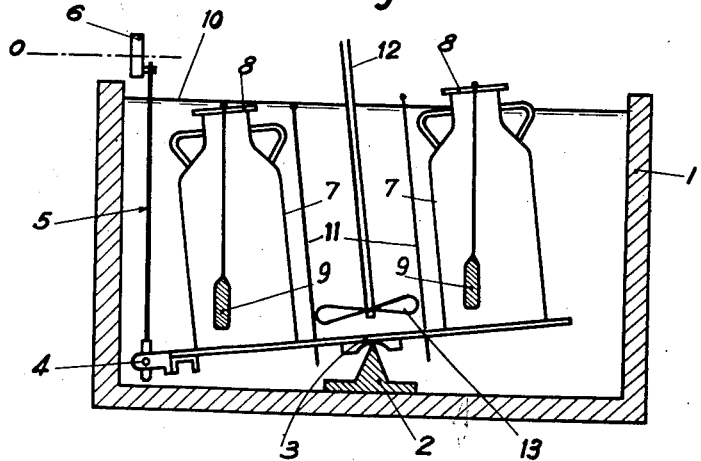
INVENTOR:
HENRY G. ROBATEL
By Richardson, David and Nordon
ATTYS Patented July 22, 1952

2,604,308

UNITED STATES PATENT OFFICE 2,604,308

APPARATUS FOR AGITATING REFRIGERATED LIQUIDS

Henry G. Robatel, Paris, France, assignor of one-half to Karl S. Cate, New York, N. Y.

Application October 8, 1949, Serial No. 120,271
In France May 6, 1949

2 Claims. (Cl. 259—56)

This invention relates to refrigerating apparatus for milk and other liquids (hereinafter and in the claims referred to simply as "milk").

When milk is refrigerated in receptacles, the refrigeration does not penetrate throughout the entire mass if the milk is in a state of rest, no matter how protracted the process. Zones of varying temperatures are set up throughout the milk during the process, the zone in the immediate vicinity of the walls of the receptacle becoming a frigid zone, and that most remote from the walls of the receptacle, i. e. the centre of the mass of the milk, forming a kind of independent core which is not affected by the cooling process. As a result, the process is not only incomplete, but there is a danger that the milk may be deteriorated due to the contact between the two zones whereof the different temperatures promote different actions on the microorganisms.

The object of the present invention is to provide a refrigerating apparatus for milk, in which the milk is thoroughly refrigerated with the minimum of temperature fluctuations throughout the mass thereof.

According to the present invention refrigerating apparatus for milk comprises a container for a liquid cooling medium, means for supporting at least one receptacle for milk within said container, and means for imparting movement to said receptacle relative to the container, whereby the milk is agitated and the setting up of zones of different temperatures throughout the mass thereof is inhibited.

Preferably, a stirring device is provided within said container to circulate said cooling medium in order to keep the temperature thereof substantially equal throughout its mass.

Preferably, also, each receptacle is provided with one or more pendulous blades suspended from the inside face of its closure, whereby, when said to and fro movement occurs, said blades oscillate relative to said closures and stir up the milk in said receptacles.

The invention will now be described, by way of example, with reference to the accompanying drawings, in which:

Fig. 1 is a diagrammatic longitudinal sectional elevation of an apparatus for refrigerating milk; and Fig. 2 is a view similar to Fig. 1, but illustrating another position assumed by the milk receptacles during the refrigerating process.

Referring, in the first instance, to Figs. 1 and 2 of the drawings, the refrigerating apparatus comprises a container 1 at the bottom of which there is located a support 2 in the form of a balance knife. A plate 3, articulated at 4 on a push rod 5, is supported on the support 2. The other end of the push rod 5 is mounted eccentrically on a crank pin 6 adapted to rotate with a motor shaft O.

Two receptacles 7 are mounted on the plate 3, each receptacle being closed by a closure 8 from which a pendulous stirring blade 9 is freely suspended.

A hollow vertical tube 11, open at both ends, is located intermediate the two receptacles 7 and the top end thereof is below the level 10 of the liquid cooling medium in the container 1. A shaft 12 is mounted co-axially with the tube 11 and a screw propeller 13 is mounted on the lower end of said shaft for rotation therewith. The shaft is adapted to be driven by a motor (not shown).

In operation, the receptacles 7 are filled with the milk to be cooled, the closures 8 are applied to the receptacles, and the motors which drive the shafts O and 12 are started up. The motor shaft O rotates the crank pin 6 which causes upwards and downwards movement of the push rod 5, which movement is transmitted to the articulation 4, thereby effecting oscillatory movement of the plate 3 about the knife edge of the support 2. The receptacles 7 are constrained to follow the movement of the plate 3, and the pendulous stirring blades 9, which, owing to their inertia, remain substantially vertical or follow the motion of the receptacles only to a very small extent, will alternately assume the positions indicated in dotted lines at $9^1$ in Fig. 1 relative to their respective receptacle. These positions are, of course, not true in this figure but are merely indicated thereon in order to show the approximate extent of the oscillations of the blades 9 relative to the receptacles.

It will be evident that the combination of the oscillation proper of the masses of milk in the receptacles, and the relative displacements of the blades 9, will ensure that the milk is sufficiently agitated and stirred up to inhibit the formation of independent zones of different temperatures therein, and will tend to maintain a substantially equal temperature throughout the mass of the milk. The blades 9 may be helically twisted to enhance their stirring action.

The shaft 12 rotates the screw propellor 13 which causes the liquid refrigerant to circulate as indicated by the arrows Z, $Z^1$, Y, $Y^1$, and W, $W^1$, by a "noria" movement so that the entire mass of the liquid refrigerant passes up the tube 11 and is constantly stirred up, i. e. the propeller 13 functions in the tube 11 on the principle of an Archimedian screw. In this way the temperature of the liquid refrigerant is maintained substantially equal throughout its mass.

The dimensions of the container 1 and the number and capacity of the receptacles 7 may be varied without thereby departing from the scope of the invention, and would depend upon the output required from the apparatus. The motive power used may be electrical, mechanical or manual.

I claim:

1. Refrigerating apparatus for milk comprising a container for a liquid cooling medium, a cylinder open at both ends and located entirely below the level of said liquid cooling medium, a screw propeller mounted within said cylinder coaxially therewith and adapted for rotation to circulate said medium in order to keep the temperature thereof substantially equal throughout its mass, means for supporting at least one receptacle for milk within said container, and means for imparting movement to said receptacle relative to the container, whereby the milk is agitated and the setting up of zones of different temperatures throughout the mass thereof is inhibited.

2. Refrigerating apparatus for milk comprising a container for a liquid cooling medium, a cylinder open at both ends and located entirely below the level of said liquid cooling medium, a screw propeller mounted within said cylinder coaxially therewith and adapted for rotation to circulate said medium in order to keep the temperature thereof substantially equal throughout its mass, means for supporting at least one receptacle for milk within said container, at least one pendulous blade suspended within the receptacle from the inside face of the receptacle closure, and means for imparting movement to said receptacle relative to the container, whereby the milk in the receptacle is stirred up by relative movement between said blade and said closure and setting up of zones of different temperatures throughout the mass of the milk is inhibited.

ROBATEL, G. HENRY.

REFERENCES CITED

The following references are of record in the file of this patent:

UNITED STATES PATENTS

| Number | Name | Date |
|---|---|---|
| 218,557 | Myers | Aug. 12, 1879 |
| 2,079,549 | De Cremer | May 4, 1937 |
| 2,183,221 | Krug | Dec. 12, 1939 |
| 2,345,130 | Latham | Mar. 28, 1944 |